United States Patent
Tamaki et al.

(10) Patent No.: US 10,821,860 B2
(45) Date of Patent: Nov. 3, 2020

(54) SEAT DEVICE

(71) Applicant: HONDA MOTOR CO., LTD., Tokyo (JP)

(72) Inventors: Hidekazu Tamaki, Wako (JP); Takumi Sato, Wako (JP); Hideki Hitomi, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 10 days.

(21) Appl. No.: 16/217,638

(22) Filed: Dec. 12, 2018

(65) Prior Publication Data

US 2019/0184866 A1 Jun. 20, 2019

(30) Foreign Application Priority Data

Dec. 15, 2017 (JP) .................................. 2017-241018

(51) Int. Cl.

| | |
|---|---|
| *B60N 2/68* | (2006.01) |
| *B60N 2/427* | (2006.01) |
| *B60N 2/433* | (2006.01) |
| *B60N 2/20* | (2006.01) |
| *B60N 2/22* | (2006.01) |
| *B60N 2/42* | (2006.01) |

(52) U.S. Cl.
CPC .............. *B60N 2/433* (2013.01); *B60N 2/20* (2013.01); *B60N 2/22* (2013.01); *B60N 2/42709* (2013.01); *B60N 2/682* (2013.01); *B60N 2/4228* (2013.01)

(58) Field of Classification Search
CPC ............................. B60N 2/682; B60N 2/42709
See application file for complete search history.

(56) References Cited

U.S. PATENT DOCUMENTS

| | | | | |
|---|---|---|---|---|
| 6,709,053 | B1 * | 3/2004 | Humer ................. | B60N 2/4228 |
| | | | | 297/216.1 |
| 2014/0292054 | A1 * | 10/2014 | Pluta ....................... | B60N 2/22 |
| | | | | 297/354.1 |
| 2016/0207425 | A1 | 7/2016 | Kaneko et al. | |
| 2019/0217757 | A1 * | 7/2019 | Kato ....................... | B60N 2/68 |

FOREIGN PATENT DOCUMENTS

| | | | | |
|---|---|---|---|---|
| DE | 102008022120 A1 * | 11/2009 | ........... | B60N 2/4228 |
| DE | 102014004440 A1 * | 9/2014 | ......... | B60N 2/42745 |
| DE | 102014219066 A1 * | 3/2016 | ............. | B60N 2/682 |
| DE | 102016203445 A1 * | 9/2017 | ......... | B60N 2/42709 |
| FR | 2998837 A1 * | 6/2014 | ........... | B60N 2/2252 |

(Continued)

OTHER PUBLICATIONS

Office Action dated Jun. 4, 2019 issued over the corresponding Japanese Patent Application No. 2017-241018 with the English machine translation thereof.

*Primary Examiner* — Timothy J Brindley

(74) *Attorney, Agent, or Firm* — Carrier Blackman & Associates, P.C.; William D. Blackman; Joseph P. Carrier

(57) ABSTRACT

A seat device includes a seatback frame attached to a seat cushion frame via a seatback attachment member. The seatback attachment member includes a first attachment point to which the seat cushion frame extending forward is attached, a second attachment point to which the rear portion of the seat cushion frame is attached, and a third attachment point to which the lower portion of the seatback frame is rotatably attached. The second attachment point has a floating structure.

6 Claims, 7 Drawing Sheets

(56) References Cited

FOREIGN PATENT DOCUMENTS

| JP | 64-004147 U | 1/1989 | |
|---|---|---|---|
| JP | 2006-220172 A | 8/2006 | |
| JP | 2011-079524 A | 4/2011 | |
| JP | 2012-096744 A | 5/2012 | |
| JP | 2013-067281 A | 4/2013 | |
| JP | 2015-044541 A | 3/2015 | |
| WO | WO-2008017794 A2 * | 2/2008 | ......... B60N 2/42745 |
| WO | WO-2008149044 A2 * | 12/2008 | ........... B60N 2/4214 |
| WO | WO-2012013371 A1 * | 2/2012 | ............... B60N 2/02 |
| WO | WO-2012077444 A1 * | 6/2012 | ............... B60N 2/22 |
| WO | WO-2013042550 A1 * | 3/2013 | ......... B60N 2/42709 |
| WO | WO-2018215395 A1 * | 11/2018 | ............... B60N 2/22 |

* cited by examiner

THIRD TRACK

FOURTH TRACK

SEAT DEVICE

CROSS-REFERENCE TO RELATED APPLICATION

This application is based upon and claims the benefit of priority from Japanese Patent Application No. 2017-241018 filed on Dec. 15, 2017, the contents of which are incorporated herein by reference.

BACKGROUND OF THE INVENTION

Field of the Invention

The present invention relates to seat devices and, in particular, to seat devices suitable for seats of, for example, vehicles (such as cars (vehicles on wheels), planes, and ships), where such seat is adapted to be installed in an area that easily vibrates or oscillates.

Description of the Related Art

A seat device described in Japanese Laid-Open Patent Publication No. 2013-067281 is aimed at providing a shock absorbing seat for a vehicle capable of stably relieving impact load with a simple structure and capable of improving the rigidity when a seatback is biased toward, for example, the back of the vehicle.

To address the challenges, the seat device described in Japanese Laid-Open Patent Publication No. 2013-067281 includes a regulating plate extending across a weakened portion of at least one of a base bracket and a movable bracket. The regulating plate has a long hole. The bracket to which the regulating plate is secured includes an engaging projection fitted in the long hole. When an excessive load is applied to the seatback toward the front of the vehicle, the engaging projection is engaged with one end of the long hole to regulate the deformation of the weakened portion. When an excessive load is applied to the seatback toward the back of the vehicle, the engaging projection moves inside the long hole to allow the deformation of the weakened portion.

A seat device described in Japanese Laid-Open Patent Publication No. 2015-044541 is aimed at reducing concentration of a load input to a seatback frame on a fastening point of the seatback frame fastened to a joining member upon rear-end collision of a vehicle.

To address the challenge, the seat device described in Japanese Laid-Open Patent Publication No. 2015-044541 includes a patch formed on a seatback frame and a collar integrated with the patch. A stepped portion of a bolt is fitted in the collar to restrict the relative movement of the collar (patch) with respect to an upper arm. A patch flange portion receives a lower flange portion of the seatback frame when the lower flange portion moves relative to the upper arm. The patch restricts the relative movement of the seatback frame with respect to the upper arm in this manner, and the load input to the seatback frame is input to the patch.

SUMMARY OF THE INVENTION

The seat device described in Japanese Laid-Open Patent Publication No. 2013-067281 has the long hole in the regulating plate and includes the engaging projection on the bracket. The engaging projection is fitted in the long hole, and the regulating plate is secured to the bracket. However, the long hole allows only the vertical movement of the engaging projection, and thus a load applied to the seat in, for example, the longitudinal directions of the vehicle cannot be dispersed.

In the seat device described in Japanese Laid-Open Patent Publication No. 2015-044541, a reclining mechanism is secured to the inner surface of a hinge bracket in the width direction of the seat. Thus, a load applied to the seat in, for example, the width direction cannot be dispersed.

To solve the problems, a seat foot portion of the seat device may be floated by an intervening elastic member such as rubber. However, the seat foot portion includes many parts supporting a seat cushion, the seatback, and the like, and the increased shared load applied to the seat foot portion when a load is applied to the seat may be too high for the strength of the floating portion.

In addition, the height of the hip point increases when the seat foot portion is in the floating state. In this case, the layout of the floating portion cannot be configured easily due to the effects of, for example, packaging constraints.

The present invention has been devised taking into consideration the aforementioned problems, and has the object of providing a seat device capable of reducing shared load applied to a floating structure, effects on the layout of the floating structure, and vibration transmitted to a seat by attaching the floating structure to an attachment point connecting a seat cushion and a seatback instead of a typical attachment point connecting the seat and a rail.

[1] A seat device according to the present invention includes a seat foot frame, a seat cushion frame attached to the seat foot frame, and a seatback frame attached to the seat cushion frame via a seatback attachment member. The seatback attachment member includes a first attachment point to which the seat cushion frame extending forward is attached, a second attachment point to which a rear portion of the seat cushion frame is attached, and a third attachment point to which a lower portion of the seatback frame is rotatably attached. The second attachment point has a floating structure.

The first attachment point supports the seat cushion frame and the seatback frame. Thus, the shared load applied on the first attachment point increases when a load is applied to the seat device in the width direction.

The third attachment point constitutes a spindle rotating the seatback frame with respect to the seat cushion frame. Thus, the shared load applied on the third attachment point is less than the shared load applied on the first attachment point.

Since most of the shared load is applied on the first attachment point and the third attachment point, the shared load applied on the second attachment point having the floating structure is reduced, and thus the strength of the floating structure is maintained.

Providing the floating structure for the seat foot frame increases the height of the hip point. In contrast, providing the floating structure for the second attachment point does not cause changes in the height of the hip point. Consequently, the seat device is not affected by packaging constraints. In addition, the layout of the floating structure can easily be configured, leading to an increase in design flexibility.

[2] In the present invention, the floating structure may include an opening in the second attachment point of the seatback attachment member, a hole portion in which a fastening bolt secured to the seat cushion frame is fitted; and an elastic member disposed between the opening and the hole portion.

The floating structure having a bush structure reduces vibration of, for example, 24 Hz or higher generated in the seat device to a level as low as the vibration of a structure using an existing dynamic damper in a case where a load is applied to the seat device in, for example, the width direction. In addition, the seat structure can be simplified and lightened.

[3] In the present invention, the elastic member may have a plurality of through-holes. The through-holes, that is, bores in the elastic member reduce vibration of, for example, 20 Hz or higher generated in the seat device compared with the existing dynamic damper. The effects of reducing vibration can be increased by only creating the plurality of through-holes in the elastic member of the bush structure.

[4] In the present invention, the seat device may further include a collar member in which the fastening bolt is fitted, and a gap or spacing larger than a thickness of the seatback attachment member at the second attachment point may be left between a flange of the collar member and a head of the fastening bolt.

As described above, the bush structure reduces the eigenvalues of the seat device and prevents resonance with the torsional vibration of the body. Furthermore, adding the backlash element (vibration damping property) to reduce the responsiveness increases the effects of reducing vibration of the seat device.

More specifically, the backlash element provided for the floating structure reduces the eigenvalues of the seat device and, furthermore, reduces the responsiveness.

[5] In the present invention, a silencing member may be disposed between the flange of the collar member and the head of the fastening bolt. The silencing member may include a resin washer and a resin collar member attached between the head of the fastening bolt and the collar member (60a), and a gap larger than the thickness of the seatback attachment member at the second attachment point may be left between the resin washer and a flange of the resin collar member.

The backlash element provided for the bush structure may produce sound that might be recognized as unusual noise when coming into contact with the second attachment point. The silencing member provided for the backlash element prevents production of such sound, that is, generation of such unusual noise.

In accordance with the seat device according to the present invention, the seat device is capable of reducing the shared load applied to the floating structure, effects on the layout of the floating structure, and vibration transmitted to the seat by attaching the floating structure to the attachment point connecting the seat cushion and the seatback instead of a typical attachment point connecting the seat and a rail.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

A preferred embodiment of a seat device according to the present invention will be described in detail below with reference to FIGS. 1 to 7B.

Figure 1:
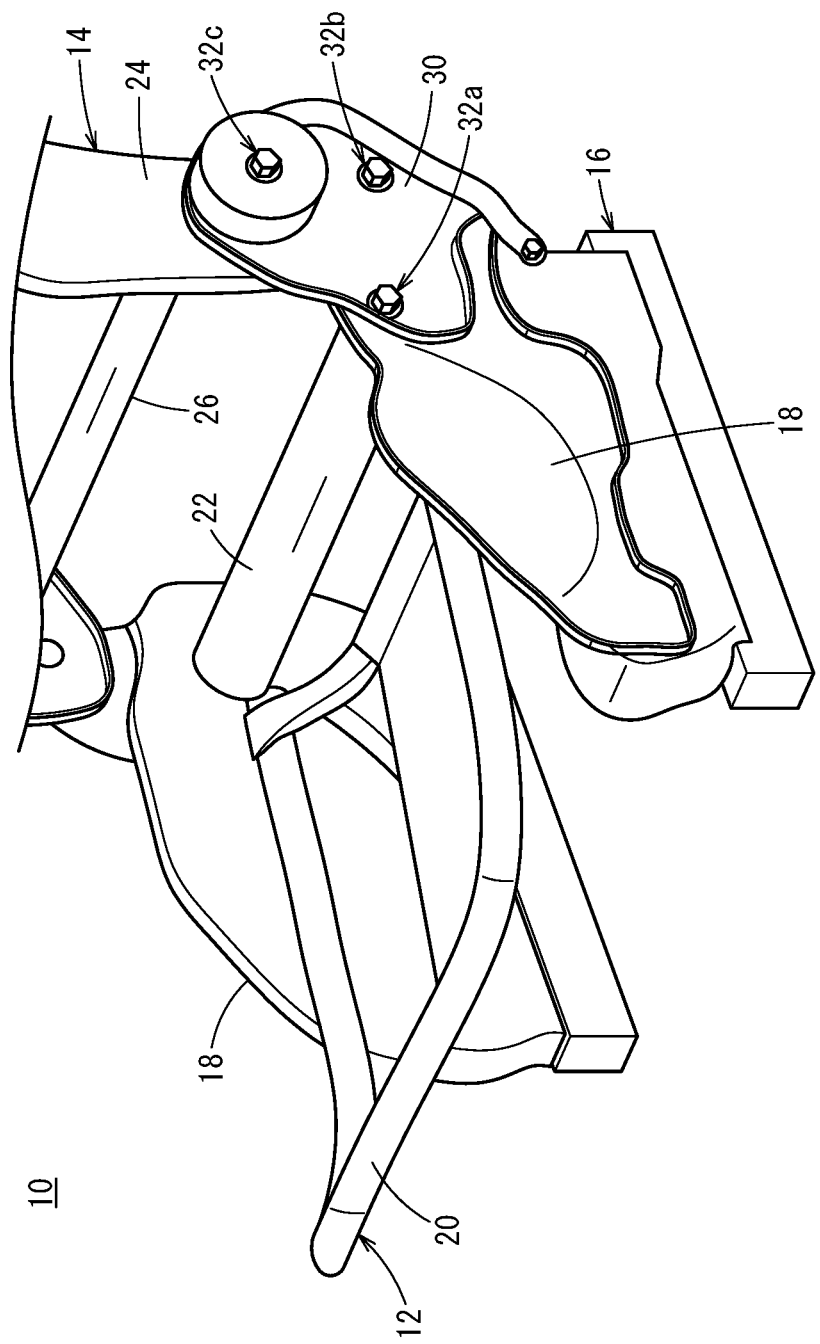
FIG. 1 is a perspective view illustrating a part of a seat device according to this embodiment.

As illustrated in FIG. 1, for example, a seat device according to this embodiment (hereinafter referred to as "seat device 10") includes at least a seat cushion frame 12, a seatback frame 14, and seat foot frames 16 installed on the floor or the like of vehicles such as cars (vehicles on wheels), ships, and planes. The seat device 10 is installed to be slidable in, for example, the longitudinal direction of a vehicle by the seat foot frames 16. The seat device 10 may be secured to the floor or the like instead of being slidable.

As illustrated in FIG. 1, the seat cushion frame 12 has a frame shape formed of, for example, a left and right pair of cushion side frames 18 extending in the longitudinal direction, a front frame 20 extending between front portions of the cushion side frames 18, and a rear frame 22 extending between rear portions of the cushion side frames 18. The seat foot frames 16 are attached to the respective cushion side frames 18.

The seatback frame 14 has a frame shape formed of a left and right pair of back side frames 24 extending substantially vertically, a lower back frame 26 extending between lower end portions of the left and right back side frames 24, and a reinforcing pole (not illustrated) extending between upper portions of the back side frames 24. The lower back frame 26 is joined to lower portions of the back side frames 24 by, for example, welding.

In particular, a lower portion of the seatback frame 14 is rotatably attached to a rear portion of the seat cushion frame 12 by seatback attachment members 30. The seatback attachment members 30 are, for example, triangular metal plates or resin plates.

Figure 2A:
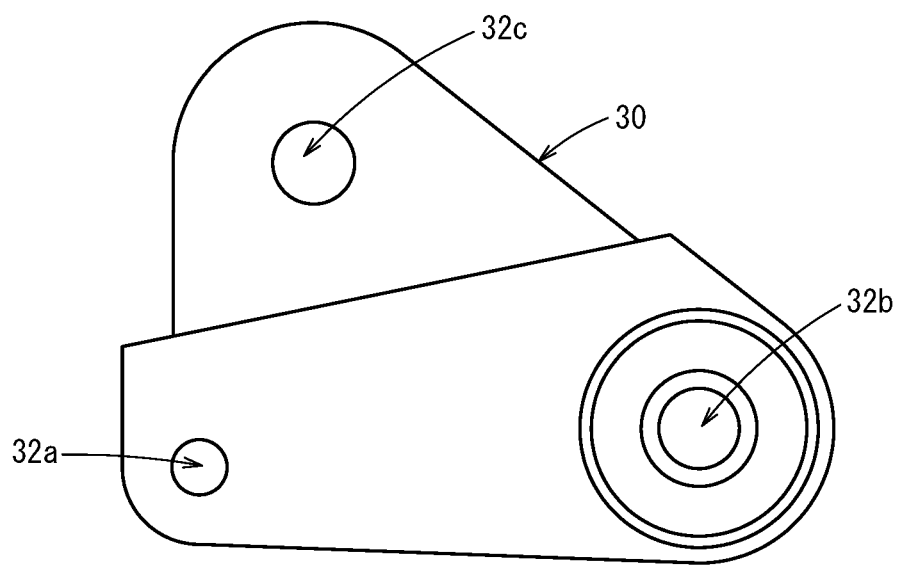
FIG. 2A is a front view illustrating a seatback attachment member.

As illustrated in FIG. 2A, the seatback attachment members 30 each include a first attachment point 32a located at a front position, a second attachment point 32b located at a rear position, and a third attachment point 32c located at an upper position.

An upper portion of the seat cushion frame 12 is attached to the first attachment point 32a of the seatback attachment member 30, the rear portion of the seat cushion frame 12 is attached to the second attachment point 32b, and the lower portion of the seatback frame 14 is rotatably attached to the third attachment point 32c. In particular, the second attachment point 32b has a floating structure.

The floating structure will now be described using three example structures (first to third example structures) with reference to FIGS. 2B to 6B.

Figure 2B:
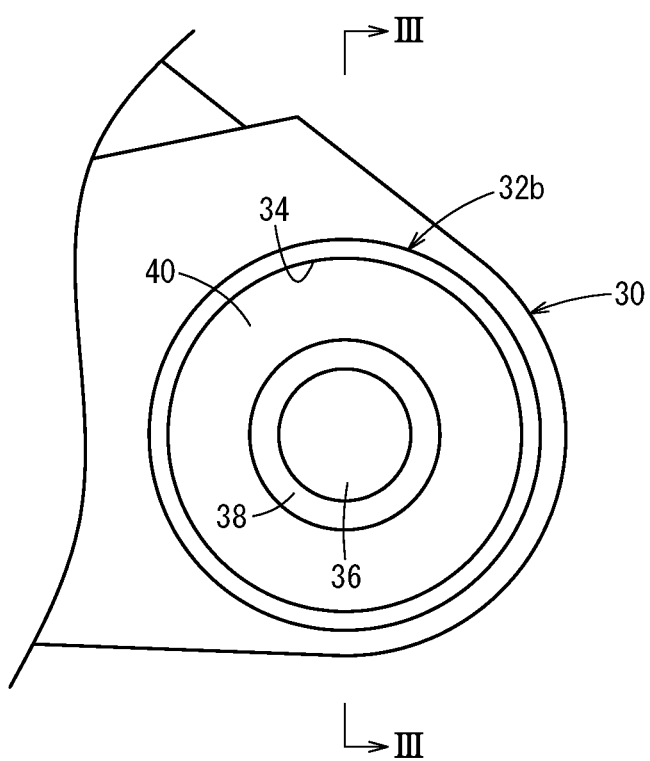
FIG. 2B is an enlarged front view illustrating a second attachment point of the seatback attachment member.
Figure 3:
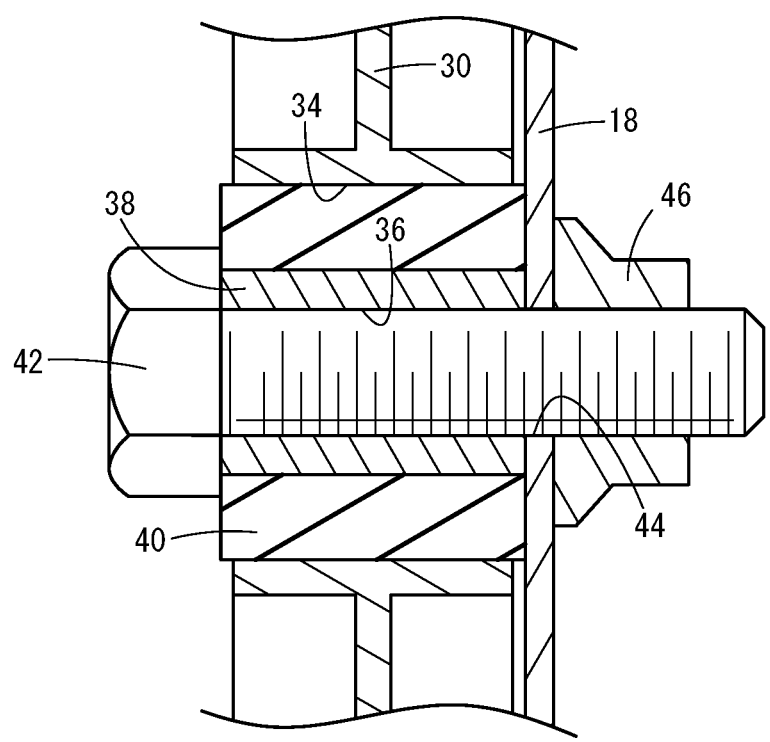
FIG. 3 is a cross-sectional view taken along line III-III in FIG. 2B.

As illustrated in FIGS. 2B and 3 (cross-sectional view), the first example structure includes an opening 34 (see FIG. 3) in the second attachment point 32b of the seatback attachment member 30, a ring 38 (see FIG. 3) composed of metal or resin having a hole portion 36, and an elastic member 40 (such as rubber) disposed between the inner circumference of the opening 34 and the outer circumference of the ring 38. A fastening bolt 42 (see FIG. 3) secured to the seat cushion frame 12 is fitted in the hole portion 36 of the ring 38. As illustrated in FIG. 3, the fastening bolt 42 is fitted into, for example, a through-hole 44 of the cushion side frame 18 and secured to the seat cushion frame 12 with a nut 46 screwed onto the fastening bolt 42 from the end.

When the seatback attachment member 30 is attached to the seat device 10, the first attachment point 32a of the seatback attachment member 30 is secured to, for example, the upper portion of the seat cushion frame 12 using a bolt (see FIG. 1) or the like, and the second attachment point 32b of the seatback attachment member 30 is secured to the rear portion of the cushion side frame 18 with the fastening bolt 42 fitted into the hole portion 36 and the nut 46 screwed onto the fastening bolt 42 from the end. Then, the lower portion of the seatback frame 14 is rotatably attached to the third attachment point 32c of the seatback attachment member 30.

Figure 4:
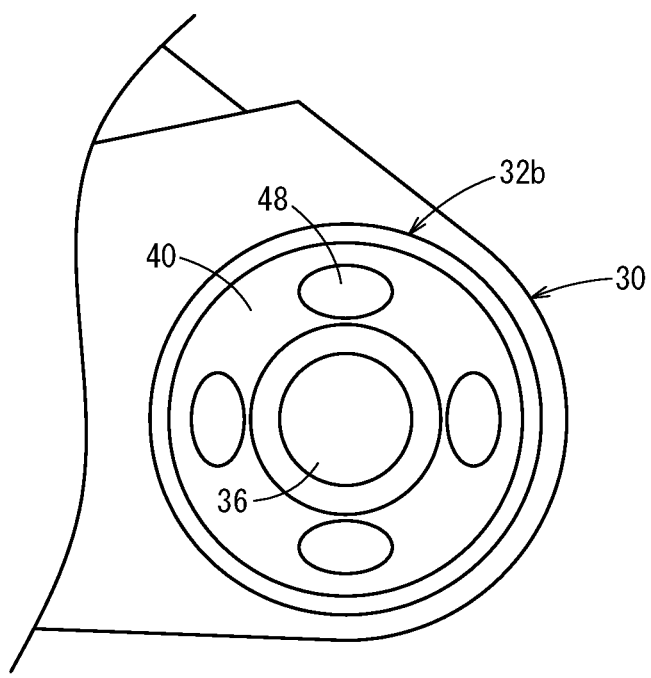
FIG. 4 is a front view illustrating an example of an elastic member with a plurality of through-holes created in the second attachment point of the seatback attachment member.

As illustrated in FIG. 4, the second example structure is substantially similar to the first example structure except for a plurality of through-holes 48 in the elastic member 40. In the example illustrated in FIG. 4, four through-holes 48 are created at regular intervals. However, the number is not limited to four, and may be two, three, or six. A large number of through-holes 48 with a diameter of, for example, 2 mm or less may be created. The through-holes 48 may have, for example, a circular shape, an elliptical shape, or a shape of a running track.

Figure 5A:
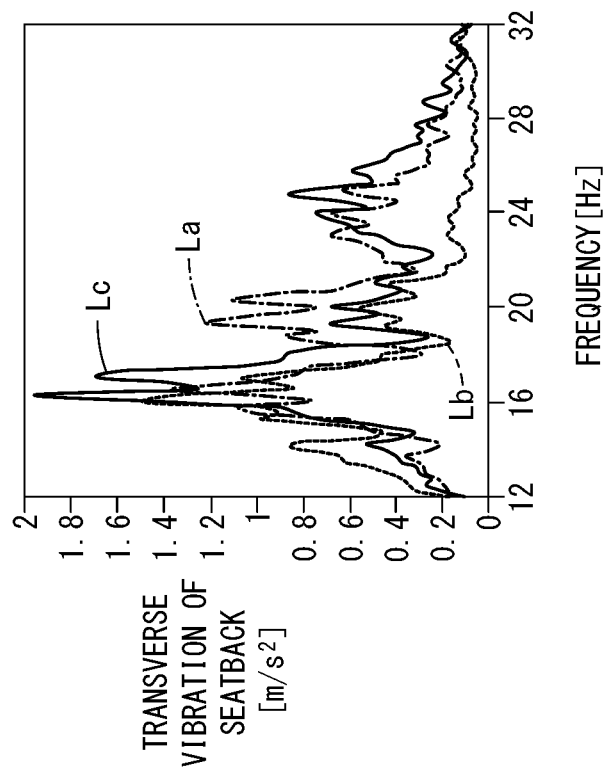
FIGS. 5A and 5B are graphs illustrating results of a first example experiment and a second example experiment, respectively, on effects of reducing vibration using a first example structure, a second example structure, and a reference structure of the seatback attachment member.
Figure 5B:
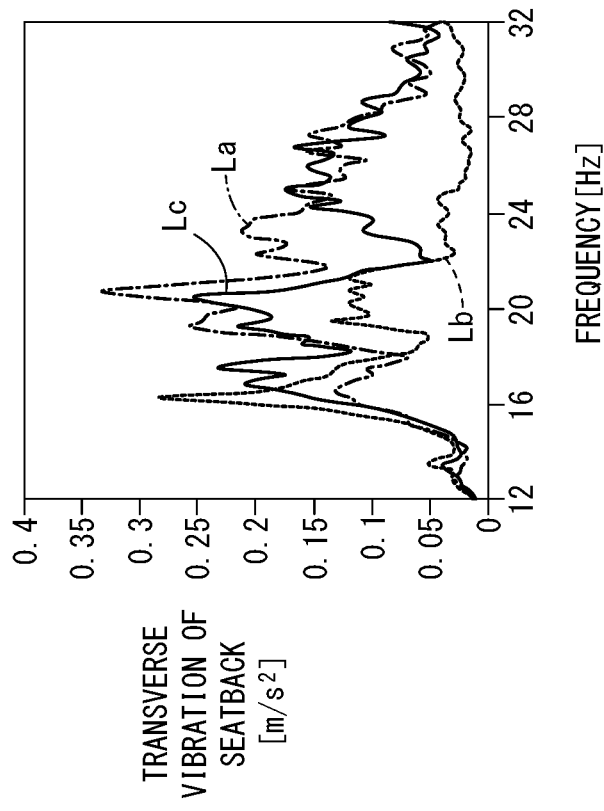

Next, a first example experiment and a second example experiment on effects of reducing vibration using the first example structure, the second example structure, and a reference structure will be described with reference to FIGS. 5A and 5B, respectively. The second example structure had four circular through-holes 48 in the elastic member 40 at regular intervals (see FIG. 4). The reference structure used an existing dynamic damper to reduce vibration.

In the first example experiment, effects of reducing vibration on a first track on which the peak transverse vibration of the seatback was 0.4 m/s$^2$ were studied. The results are illustrated in FIG. 5A. In the second example experiment, effects of reducing vibration on a second track on which the peak transverse vibration of the seatback was 2.0 m/s$^2$ were studied. The results are illustrated in FIG. 5B. In FIGS. 5A and 5B, curves La, Lb, and Lc respectively represent the characteristics of the first example structure, the second example structure, and the reference structure.

It is clear from the results of the first example experiment that the first example structure reduces vibrations of a frequency of 24 Hz or higher to a level as low as the structure using the existing dynamic damper does. It is clear that the second example structure reduces vibrations of a frequency of 18 Hz or higher to a level lower than the first example structure and the structure using the existing dynamic damper do.

In addition, as the first example experiment, it is clear from the results of the second example experiment that the first example structure reduces vibrations of a frequency of 24 Hz or higher to a level as low as the structure using the existing dynamic damper does. It is clear that the second example structure reduces vibrations of a frequency of 18 Hz or higher to a level lower than the first example structure and the structure using the existing dynamic damper do.

Next, a third example structure will be described with reference to FIGS. 6A and 6B. The third example structure includes a backlash element as the floating structure unlike the first example structure and the second example structure.

More specifically, the third example structure includes a first collar member 60a and a second collar member 60b. The first collar member 60a is fitted in a through-hole 62 of the second attachment point 32b of the seatback attachment member 30, and the fastening bolt 42 is fitted in the first collar member 60a. The first collar member 60a is preferably composed of metal, for example, iron, iron alloy, aluminum, or aluminum alloy.

The first collar member 60a has a shape of which outer diameter changes, for example, in a stepped manner, and includes a first small diameter portion 64 on the outer side (the seatback attachment member 30 side) and a first large diameter portion 66 (flange portion) on the inner side (the cushion side frame 18 side) integrated with each other. The diameter da of the first large diameter portion 66 is larger than the diameter db of the through-hole 62 in the vertical direction (see FIG. 6B), and the diameter dc of the first small diameter portion 64 is smaller than the diameter db of the through-hole 62 in the vertical direction.

The second collar member 60b is fitted in the through-hole 62 of the second attachment point 32b of the seatback attachment member 30, and the first collar member 60a is fitted in the second collar member 60b. The second collar member 60b also has a shape of which outer diameter changes, for example, in a stepped manner, and includes a second small diameter portion 68 on the outer side (the seatback attachment member 30 side) and a second large diameter portion 70 (flange portion) on the inner side (the cushion side frame 18 side) integrated with each other. The diameter dd of the second large diameter portion 70 is larger than the diameter db of the through-hole 62 in the vertical direction (see FIG. 6B), and the diameter de of the second small diameter portion 68 is slightly smaller than the diameter of the through-hole 62 in the longitudinal direction. The second collar member 60b is preferably composed of, for example, resin or rubber preventing noise generated at contact of the cushion side frame 18.

Figure 6A:
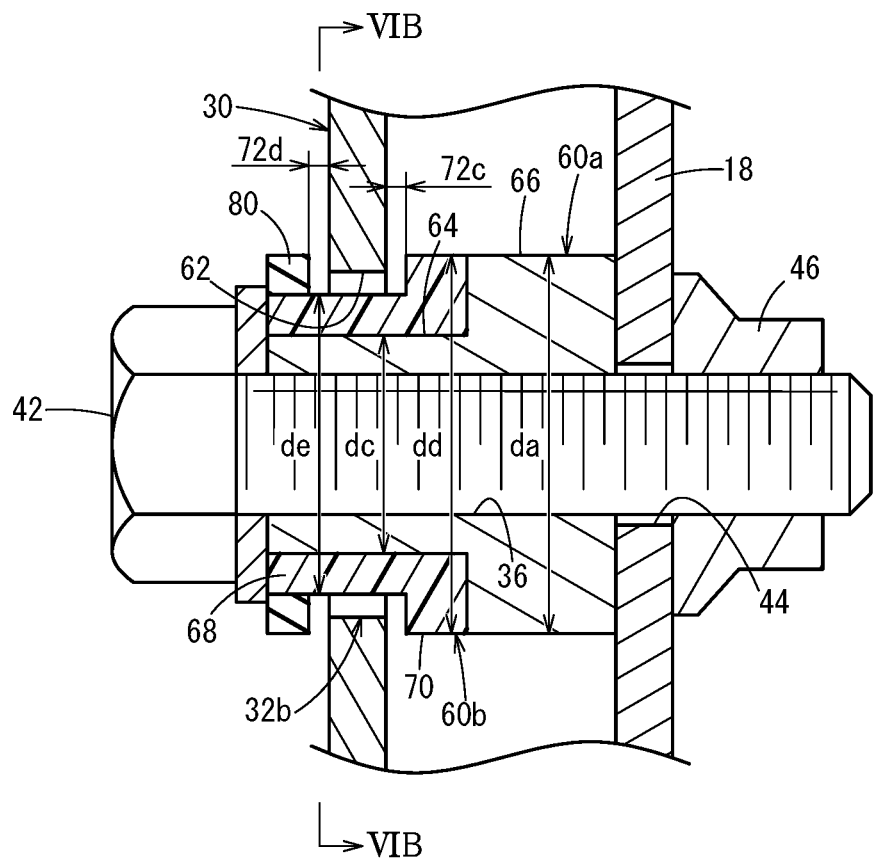
FIG. 6A is a cross-sectional view illustrating a third example structure of the seatback attachment member.
Figure 6B:
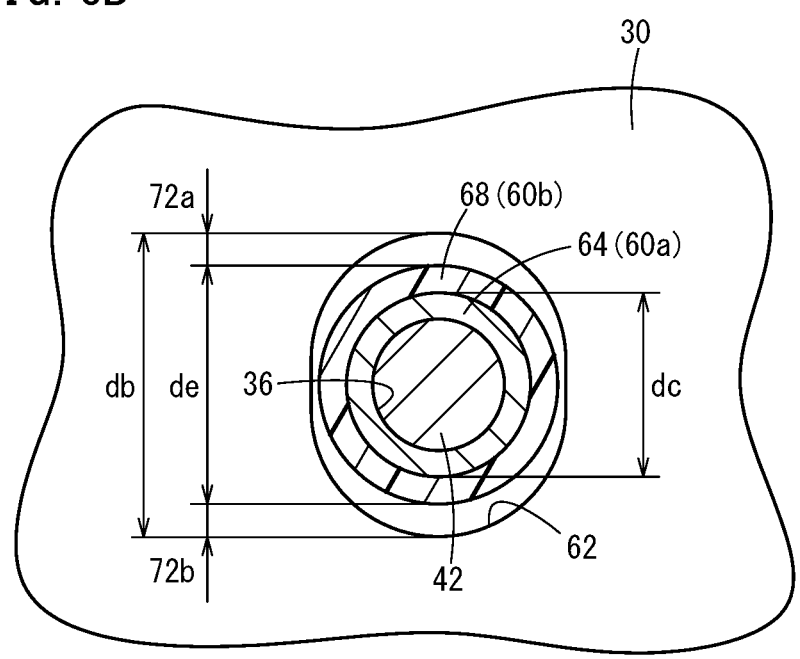
FIG. 6B is a cross-sectional view taken along line VIB-VIB in FIG. 6A.

For example, as illustrated in FIG. 6B, when the central axis of the second collar member 60b and the center of the through-hole 62 coincide with each other, a first gap 72a and a second gap 72b of about 1 mm each are left between the second collar member 60b and the through-hole 62, in particular, in the vertical direction. Small gaps of 0.5 mm or less each are left in the longitudinal direction. The size of the first gap 72a and the size of the second gap 72b may be identical to or different from each other.

The first gap 72a and the second gap 72b facilitate relative vertical movement of the seatback attachment member 30 and the seatback frame 14 with respect to the rear portion of the cushion side frame 18, resulting in an increase in the effects of reducing the vibration of the seat device 10. More specifically, providing a backlash element for the floating structure reduces the eigenvalues of the seat device 10 and, furthermore, reduces the responsiveness.

Due to the above-described dimensional relationships, the first large diameter portion 66 of the first collar member 60a is always located on the outer side of the rear portion of the cushion side frame 18 and on the inner side of the second collar member 60b.

Furthermore, the above-described backlash element includes an annular washer 80 to which an end of the second small diameter portion 68 of the second collar member 60b is fitted and secured. The washer 80 is rectangular in section, and is composed of, for example, resin or rubber as is the second collar member 60b. That is, the second collar member 60b and the washer 80 constitute a silencing member.

Here, it is assumed that, as illustrated in FIG. 6A, the center of the second attachment point 32b (center of the through-hole 62) of the seatback attachment member 30 is located at the center between the inner end surface of the second large diameter portion 70 of the second collar member 60b and the outer end surface of the washer 80. At this moment, a third gap 72c of about 1 mm is left between the outer end surface of the second large diameter portion 70 of the second collar member 60b and the opposing inner end surface of the rear portion of the seatback attachment member 30. Moreover, a fourth gap 72d of about 1 mm is left between the inner end surface of the washer 80 and the opposing outer end surface of the rear portion of the seatback attachment member 30.

An example assembling procedure for connecting the cushion side frame 18 and the seatback attachment member 30 using the above-described backlash element will now be described briefly.

First, for example, the first small diameter portion 64 of the first collar member 60a is fitted into the through-hole of the second collar member 60b to assemble the second collar member 60b to the first collar member 60a. The through-hole of the first collar member 60a and the through-hole 62 of the second attachment point 32b of the seatback attachment member 30 are positioned, and the fastening bolt 42 is fitted from the outside of the seatback attachment member 30 to the inside. At this moment, the fastening bolt 42 is fitted into the through-hole of the second attachment point 32b of the seatback attachment member 30 and the through-hole of the first collar member 60a.

That is, the rear portion of the cushion side frame 18 is assembled to the inner side of the seatback attachment member 30. For example, the seatback attachment member 30 is moved toward the rear portion of the cushion side frame 18 such that the first small diameter portion 64 of the first collar member 60a and the second small diameter portion 68 of the second collar member 60b after assembly are fitted into the through-hole 62 of the rear portion of the seatback attachment member 30. This causes the first small diameter portion 64 of the first collar member 60a and the second small diameter portion 68 of the second collar member 60b after assembly to protrude outward from the rear portion of the seatback attachment member 30. Subsequently, the washer 80 is fitted onto the end of the second small diameter portion 68 of the second collar member 60b.

Then, the fastening bolt 42 is fitted into the through-hole of the first collar member 60a, and the nut 46 is screwed onto the end of the fastening bolt 42 protruding from the inner side of the rear portion of the cushion side frame 18 to secure the nut 46, the first collar member 60a, the second collar member 60b, and the washer 80 to the seatback attachment member 30.

Figure 7A:
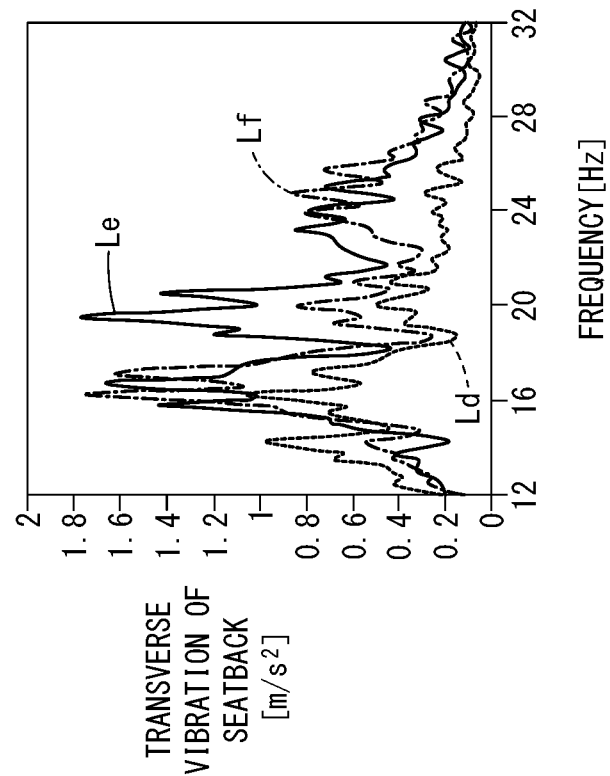
FIGS. 7A and 7B are graphs illustrating results of a third example experiment and a fourth example experiment, respectively, on effects of reducing vibration using the third example structure, a first reference structure, and a second reference structure of the seatback attachment member.
Figure 7B:
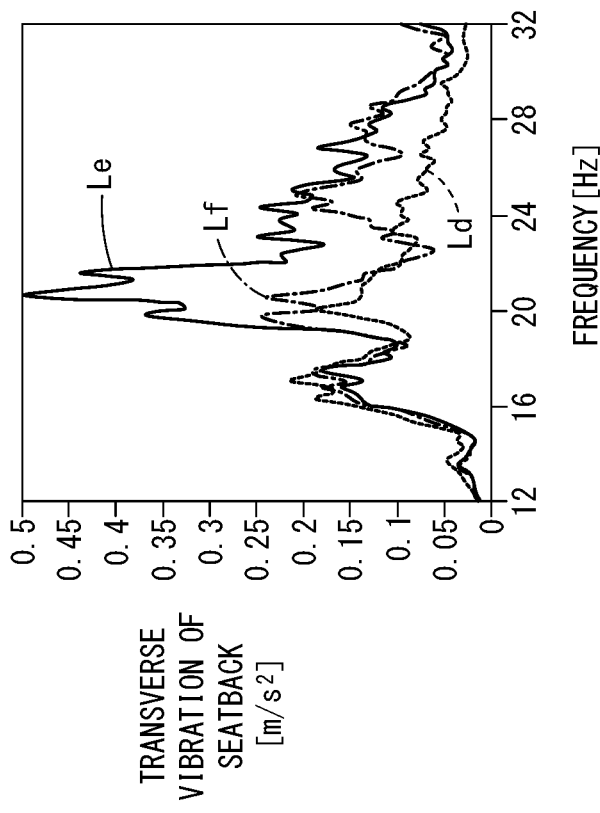

Next, a third example experiment and a fourth example experiment on effects of reducing vibration using the third example structure, a first reference structure, and a second reference structure will be described with reference to FIGS. 7A and 7B, respectively. The first reference structure did not use the existing dynamic damper, and the second reference structure used the existing dynamic damper to reduce vibration.

In the third example experiment, effects of reducing vibration on a third track on which the peak transverse vibration of the seatback was 0.5 m/s$^2$ were studied. The results are illustrated in FIG. 7A. In the fourth example experiment, effects of reducing vibration on a fourth track on which the peak transverse vibration of the seatback was 2.0 m/s$^2$ were studied. The results are illustrated in FIG. 7B. In FIGS. 7A and 7B, curves Ld, Le, and Lf respectively represent the characteristics of the third example structure, the first reference structure, and the second reference structure.

It is clear from the results that, on the third track, the third example structure reduces vibrations of a frequency of 19 Hz or higher, in general, to a level as low as or lower than the structure using the existing dynamic damper does. It is clear that, on the fourth track, the third example structure reduces vibrations of a frequency of 15 Hz or higher, in general, to a level lower than the structure using the existing dynamic damper does.

As described above, the seat device 10 according to this embodiment includes the seat foot frames 16, the seat cushion frame 12 attached to the seat foot frames 16, and the seatback frame 14 attached to the seat cushion frame 12 via the seatback attachment members 30. The seatback attachment members 30 each include the first attachment point 32a to which the seat cushion frame 12 extending forward is attached, the second attachment point 32b to which the rear portion of the seat cushion frame 12 is attached, and the third attachment point 32c to which the lower portion of the seatback frame 14 is rotatably attached. The second attachment point 32b has the floating structure.

The first attachment point 32a supports the seat cushion frame 12 and the seatback frame 14. Thus, the shared load applied on the first attachment point 32a increases when a load is applied to the seat device 10 in the width direction.

The third attachment point 32c constitutes a spindle that rotates the seatback frame 14 with respect to the seat cushion frame 12. Thus, the shared load applied on the third attachment point 32c is less than the shared load applied on the first attachment point 32a.

Since most of the shared load is applied on the first attachment point 32a and the third attachment point 32c, the shared load applied on the second attachment point 32b is reduced.

Thus, the shared load applied on the second attachment point 32b having the floating structure is reduced and the strength of the floating structure is maintained.

Providing the floating structure for the seat foot frames 16 increases the height of the hip point. In contrast, providing the floating structure for the second attachment point 32b does not cause changes in the height of the hip point. Consequently, the seat device 10 is not affected by packaging constraints. In addition, the layout of the floating structure can easily be configured, leading to an increase in design flexibility.

In this embodiment, the floating structure includes the opening 34 in the second attachment point 32b of the seatback attachment member 30, the hole portion 36 in which the fastening bolt 42 secured to the seat cushion frame 12 is fitted, and the elastic member 40 disposed between the opening portion 34 and the hole portion 36.

The floating structure having a bush structure reduces vibration of, for example, 24 Hz or higher generated in the seat device 10 to a level as low as the structure using the existing dynamic damper does in a case where a load is applied to the seat device 10 in, for example, the width direction. In addition, the seat structure can be simplified and lightened.

In this embodiment, the elastic member 40 has the plurality of through-holes 48. The through-holes 48, that is, bores in the elastic member 40 reduce vibration of, for example, 20 Hz or higher generated in the seat device 10 compared with the existing dynamic damper. The effects of reducing vibration can be increased by only creating the plurality of through-holes 48 in the elastic member 40 of the bush structure.

In this embodiment, the fastening bolt 42 is fitted in the collar member 60*a*, and a gap larger than the thickness of the second attachment point 32*b* is left between the flange of the collar member 60*a* and the fastening bolt 42.

As described above, the bush structure reduces the eigenvalues of the seat device 10 and prevents resonance with the torsional vibration of the body. Furthermore, adding the backlash element (vibration damping property) to reduce the responsiveness increases the effects of reducing vibration of the seat device 10.

More specifically, the backlash element provided for the floating structure reduces the eigenvalues of the seat device 10 and, furthermore, reduces the responsiveness.

In this embodiment, the silencing member is disposed between the flange of the collar member 60*a* and the fastening bolt 42. The silencing member includes the resin washer 80 disposed between the fastening bolt 42 and the collar member 60*a* and the resin collar member 60*b*, and a gap or spacing larger than the thickness of the seatback attachment member 30 at the second attachment point 32*b* is left between the resin washer 80 and the flange of the resin collar member 60*b*, as shown.

The backlash element provided for the bush structure may produce sound that might be recognized as unusual noise when coming into contact with the second attachment point 32*b*. The silencing member provided for the backlash element prevents production of such sound, that is, generation of such unusual noise.

The present invention is not limited to the above-described embodiment, and various modifications can be made freely without departing from the spirit and scope of the present invention as a matter of course.

What is claimed is:

1. A seat device, comprising:
a seat foot frame;
a seat cushion frame attached to the seat foot frame; and
a seatback frame attached to the seat cushion frame via a seatback attachment member;
wherein the seatback attachment member includes:
a first attachment point to which the seat cushion frame extending forward is attached;
a second attachment point to which a rear portion of the seat cushion frame is attached; and
a third attachment point to which a lower portion of the seatback frame is rotatably attached; and
wherein at the second attachment point, a floating structure is formed of:
an opening formed in the seatback attachment member;
a first collar member in which a fastening bolt, secured to the seat cushion frame, is inserted;
and an elastic member disposed between the opening and the first collar member,
wherein the floating structure includes a gap between the elastic member and the seatback attachment member at the second attachment point,
and wherein the elastic member is operatively attached to the seat cushion frame.

2. The seat device according to claim 1, wherein a gap larger than a thickness of the seatback attachment member at the second attachment point is left between a flange of the first collar member and a head of the fastening bolt.

3. The seat device according to claim 2, further comprising:
a silencing member disposed between the flange of the first collar member and the head of the fastening bolt; wherein:
the silencing member includes a resin washer and a resin collar member attached between the head of the fastening bolt and the first collar member; and
a gap larger than the thickness of the seatback attachment member at the second attachment point is left between the resin washer and a flange of the resin collar member.

4. The seat device according to claim 1, wherein the floating structure is formed only at the second attachment point of the seatback attachment member.

5. A seat device, comprising:
a seat foot frame;
a seat cushion frame attached to the seat foot frame; and
a seatback frame attached to the seat cushion frame via a seatback attachment member, wherein the seatback attachment member includes:
a first attachment point to which the seat cushion frame extending forward is attached;
a second attachment point to which a rear portion of the seat cushion frame is attached; and
a third attachment point to which a lower portion of the seatback frame is pivotally attached,
wherein the second attachment point has a floating structure, the floating structure including:
an opening in the second attachment point of the seatback attachment member;
a collar member in which a fastening bolt, secured to the seat cushion frame is inserted; and
an elastic member disposed between the opening and the collar member,
wherein the elastic member has a plurality of through-holes formed therein.

6. A seat device, comprising:
a seat foot frame;
a seat cushion frame attached to the seat foot frame; and
a seatback frame attached to the seat cushion frame via a seatback attachment member, wherein the seatback attachment member includes:
a first attachment point to which the seat cushion frame extending forward is attached:
a second attachment point to which a rear portion of the seat cushion frame is attached; and
a third attachment point to which a lower portion of the seatback frame is rotatably attached;
wherein the second attachment point has a floating structure, the floating structure including:
an opening formed in the seatback attachment member at the second attachment point;
a first collar member in which a fastening bolt, secured to the seat cushion frame, is inserted: and
an elastic member disposed between the opening and the first collar member,
wherein the elastic member includes a silencing member disposed between a flange of the first collar member and a head of the fastening bolt, the silencing member includes a resin washer and a resin collar member attached between the head of the fastening bolt and the first collar member; and a gap larger than a thickness of the seatback attachment member at the second attachment point is left between the resin washer and a flange of the resin collar member.

* * * * *